(12) United States Patent
Nakano et al.

(10) Patent No.: US 12,252,133 B2
(45) Date of Patent: Mar. 18, 2025

(54) VEHICLE AGENT DEVICE, VEHICLE AGENT SYSTEM, AND COMPUTER-READABLE STORAGE MEDIUM

(71) Applicant: TOYOTA JIDOSHA KABUSHIKI KAISHA, Toyota (JP)

(72) Inventors: Keiko Nakano, Kawasaki (JP); Chikage Kubo, Chofu (JP); Eiichi Maeda, Tokyo (JP); Hiroyuki Nishizawa, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 483 days.

(21) Appl. No.: 17/494,214

(22) Filed: Oct. 5, 2021

(65) Prior Publication Data

US 2022/0105948 A1    Apr. 7, 2022

(30) Foreign Application Priority Data

Oct. 7, 2020    (JP) .................................. 2020-170106

(51) Int. Cl.
 *B60W 40/08*    (2012.01)
 *G06V 20/59*    (2022.01)
 *G10L 15/22*    (2006.01)

(52) U.S. Cl.
 CPC ........... *B60W 40/08* (2013.01); *G06V 20/593* (2022.01); *G10L 15/22* (2013.01); *B60W 2040/0881* (2013.01); *B60W 2420/403* (2013.01); *G10L 2015/223* (2013.01)

(58) Field of Classification Search
 CPC ......... B60W 40/08; B60W 2040/0881; B60W 2420/403; B60W 2540/043; B60W 2556/10; G06V 20/593; G06V 20/59; G10L 15/22; G10L 2015/223
 USPC .............................................................. 701/1
 See application file for complete search history.

(56) References Cited

U.S. PATENT DOCUMENTS

| | | | |
|---|---|---|---|
| 9,946,531 B1* | 4/2018 | Fields ....................... | G07C 5/02 |
| 10,599,155 B1* | 3/2020 | Konrardy ................ | G06N 3/045 |
| 10,834,373 B2* | 11/2020 | Ahlborn ................ | G06V 40/23 |
| 11,688,293 B2* | 6/2023 | Rönnäng .................. | G06N 3/08 |
| | | | 434/62 |
| 2002/0013949 A1* | 1/2002 | Hejna, Jr. ............... | H04L 65/80 |
| | | | 725/100 |

(Continued)

FOREIGN PATENT DOCUMENTS

| | | |
|---|---|---|
| JP | H9-109803 A | 4/1997 |
| JP | 2001-141500 A | 5/2001 |

(Continued)

OTHER PUBLICATIONS

Chinese Office Action for the counterpart Chinese Patent Application No. CN202111151427 (Translated) (Year: 2023).*

*Primary Examiner* — Tuan C To
*Assistant Examiner* — Dominick Mulder
(74) *Attorney, Agent, or Firm* — Sughrue Mion, PLLC

(57) ABSTRACT

A vehicle agent device receives a captured image and vehicle information from an on-board unit, identifies an occupant from the captured image, specifies attributes of the occupant it identified, searches for vehicle functions corresponding to the attributes it specified, and sends, as description information to an on-board unit, a moving image that introduces the vehicle functions.

20 Claims, 8 Drawing Sheets

(56) References Cited

U.S. PATENT DOCUMENTS

| | | | | |
|---|---|---|---|---|
| 2006/0159417 A1* | 7/2006 | Kawamura | ........... | G11B 27/005 386/344 |
| 2015/0088375 A1* | 3/2015 | Lee | ........... | B60W 40/09 701/36 |
| 2016/0101784 A1* | 4/2016 | Olson | ........... | B60K 35/10 340/576 |
| 2017/0242653 A1* | 8/2017 | Lang | ........... | G06F 3/167 |
| 2018/0052458 A1* | 2/2018 | Tsuji | ........... | B60W 10/20 |
| 2018/0105186 A1* | 4/2018 | Motomura | ........... | G05D 1/0088 |
| 2018/0170256 A1 | 6/2018 | Medenica et al. | | |
| 2019/0082149 A1* | 3/2019 | Correnti | ........... | G08B 13/19613 |
| 2019/0263262 A1* | 8/2019 | Mimura | ........... | B60W 60/0053 |
| 2019/0300015 A1* | 10/2019 | Kodera | ........... | B60W 50/0098 |
| 2020/0151472 A1* | 5/2020 | Müller | ........... | G06F 3/011 |
| 2021/0142799 A1* | 5/2021 | Taylor | ........... | G10L 15/22 |
| 2021/0229672 A1* | 7/2021 | Herman | ........... | G06T 3/4015 |
| 2022/0167056 A1* | 5/2022 | Yamada | ........... | H04N 21/439 |

FOREIGN PATENT DOCUMENTS

| | | | |
|---|---|---|---|
| JP | 2005-67403 A | 3/2005 |
| JP | 2011-208984 A | 10/2011 |
| JP | 2018-140766 A | 9/2018 |

\* cited by examiner

VEHICLE AGENT DEVICE, VEHICLE AGENT SYSTEM, AND COMPUTER-READABLE STORAGE MEDIUM

CROSS-REFERENCE TO RELATED APPLICATION

This application is based on and claims priority under 35 USC § 119 from Japanese Patent Application No. 2020-170106 filed on Oct. 7, 2020, the disclosure of which is incorporated by reference herein.

TECHNICAL FIELD

This disclosure relates to a vehicle agent device, a vehicle agent system, and a computer-readable storage medium that provide descriptions of devices and descriptions of operations.

RELATED ART

Japanese Patent Application Laid-open (JP-A) No. 2001-141500 (patent document 1) discloses a vehicle agent processing device that furnishes information related to operations of various types of on-board units. Specifically, the vehicle agent processing device performs speech recognition when speech information including a real voice has been applied as a signal received by a wireless communication unit, and thereafter, but without performing speech recognition in the case of an email, interprets the meaning of the information by parsing it, selects information related to operations of various types of on-board units in an automobile, summarizes the information on a priority basis, converts it to speech, and outputs it from a speaker. Furthermore, in a case where it is inferred that operation of the various types of on-board units is necessary, the vehicle agent processing device automatically judges this in an agent processing unit, adds operation guidance information relating to the on-board units, and provides voice guidance.

The vehicle agent processing device of patent document 1 can introduce, by voice guidance, operation guidance information relating to the on-board units, but considering cases such as introducing functions installed in vehicles to occupants, the vehicle agent processing device has room for improvement because it provides the same voice guidance across the board without distinguishing between occupants and, depending on the occupant, has the potential to provide unnecessary introductions.

SUMMARY

Thus, it is an object of this disclosure to provide a vehicle agent device, a vehicle agent system, and a vehicle agent program that, when introducing vehicle functions to occupants, can provide introductions appropriate to each occupant.

A vehicle agent device pertaining to a first aspect includes: an identification unit that identifies an occupant who has gotten into a vehicle; a specification unit that specifies attributes of the occupant identified by the identification unit; and a control unit that performs control to output, to an on-board unit mounted in the vehicle, introduction information of a moving image that introduces, out of functions that the vehicle has, functions corresponding to the attributes specified by the specification unit.

According to the first aspect, the identification unit identifies the occupant who has gotten into the vehicle, and the specification unit specifies attributes of the occupant identified by the identification unit. Examples of the attributes include the driving skills, driving tendencies, and function awareness of the occupant and whether or not the occupant has used the vehicle functions.

Additionally, the control unit performs control to output, to the on-board unit mounted in the vehicle, the introduction information relating to the moving image that introduces, out of the functions that the vehicle has, the functions corresponding to the attributes specified by the specification unit. Because of this, the vehicle agent device introduces descriptions of functions according to the attributes of the occupant, so when introducing vehicle functions, introductions appropriate to each occupant can be provided.

The control unit may further perform processing to adjust the introduction information to a playback time according to a predetermined condition and output the introduction information it has adjusted to the on-board unit. Because of this, functions are introduced by means of the moving image whose playback time has been adjusted in accordance with the predetermined condition, so it becomes possible for the occupant to view the function description at a playback time suited to the situation of the occupant.

Furthermore, the control unit may adjust the playback time by adjusting at least one of playback speed and number of contents to be played back. By adjusting at least one of the playback speed and the number of contents to be played back in this way, the playback time can be adjusted.

Furthermore, the on-board unit may introduce the functions by means of the moving image in a case where the situation of the vehicle is a predetermined situation that will not affect driving. Because of this, the functions are introduced by means of the moving image in the case of a situation that will not affect driving, so it becomes possible to ensure safety when the occupant views the introduction of the functions by means of the moving image.

Furthermore, the control unit may output the introduction information relating to functions whose frequency of use is equal to or less than a predetermined frequency of use or functions that have not been used for a period of time equal to or greater than a predetermined period of time out of the functions corresponding to the attributes. Because of this, it becomes possible to introduce to the occupant functions that the occupant has not much used and forgotten about.

Furthermore, the control unit may specify, as the attributes, a history of vehicle models in which the occupant identified by the identification unit has ridden and, from the vehicle model history of the occupant identified by the identification unit, output the introduction information relating to functions that the occupant has never used including past vehicles out of the functions of the vehicle in which the occupant is currently riding. Because of this, it becomes possible to introduce to the occupant functions that the occupant does not know about including the history of vehicle models that the occupant used in the past.

Furthermore, the control unit may specify, as the attributes, a history of vehicle models in which the occupant identified by the identification unit has ridden and, from the vehicle model history of the occupant identified by the identification unit, output the introduction information relating to functions with methods of operation that are different from past methods of operation. Because of this, it becomes possible to suggest to the occupant functions with methods of operation that are different from methods of operation of vehicles in which the occupant has ridden in the past.

Furthermore, the vehicle agent device may further include an intention comprehension unit that comprehends the intention of the content of an utterance and a generation unit that generates response information with respect to the content of the utterance comprehended by the intention comprehension unit. Because of this, it becomes possible for the vehicle agent device to converse with the occupant by means of a dialogue.

Another aspect of the disclosure is a vehicle agent system including: the vehicle agent device described above; and an on-board unit that is provided in a vehicle, acquires information for the identification unit to identify, and receives and plays back the introduction information output from the control unit.

Still another aspect of the disclosure is a non-transitory computer-readable storage medium that stores a vehicle agent program executed by a computer to allow the computer to function as the vehicle agent device described above.

As described above, according to this disclosure, there can be provided a vehicle agent device, a vehicle agent system, and a computer-readable storage medium that, when introducing vehicle functions to occupants, can provide introductions appropriate to each occupant.

DETAILED DESCRIPTION

Figure 1:
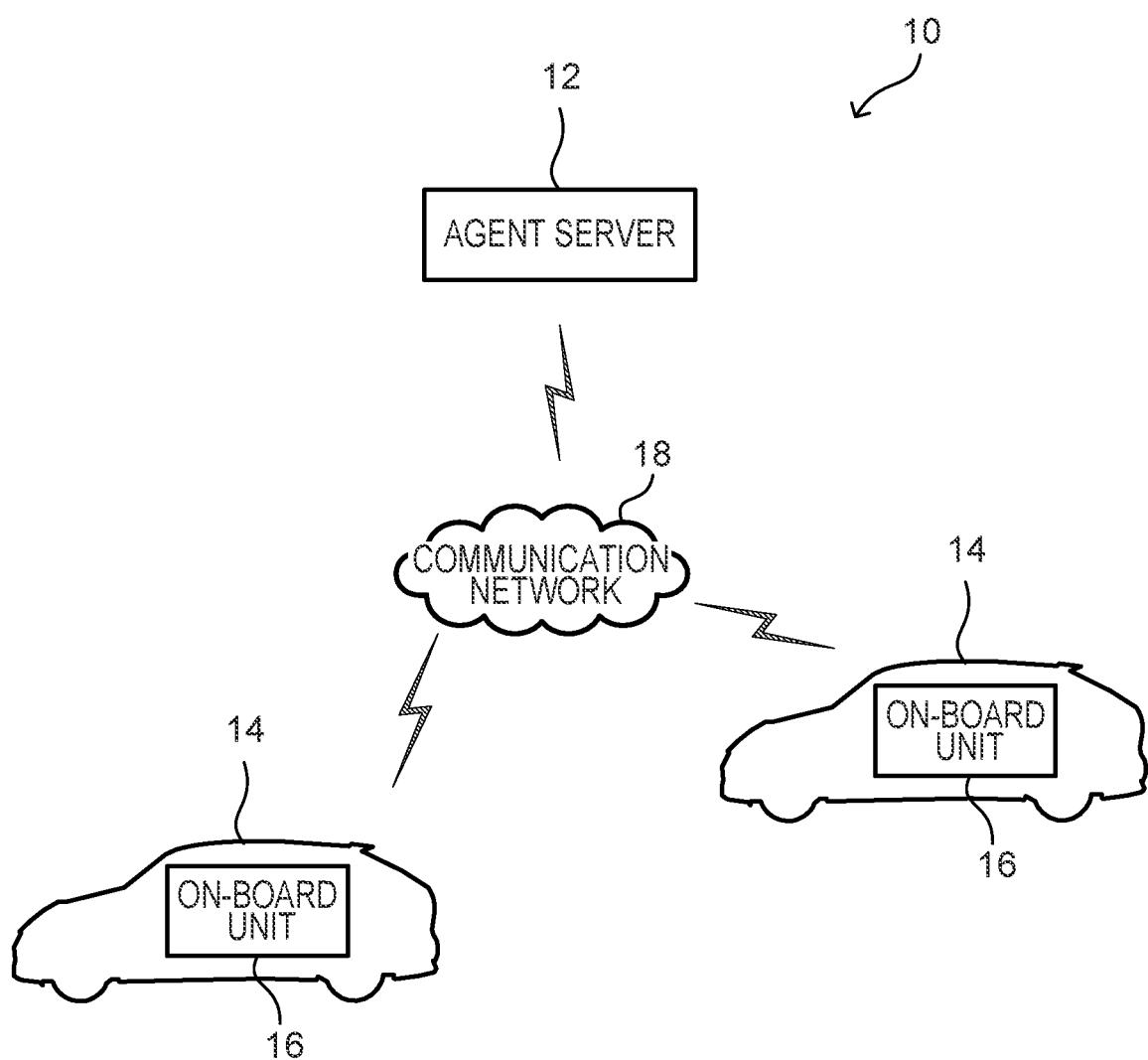
FIG. 1 is a drawing showing the schematic configuration of a vehicle agent system pertaining to an embodiment.

An example of an embodiment of the disclosure will be described in detail below with reference to the drawings. In this embodiment, a vehicle agent system 10 that furnishes an occupant with information relating to vehicle functions is described as an example. FIG. 1 is a drawing showing the schematic configuration of the vehicle agent system 10 pertaining to the embodiment.

As shown in FIG. 1, the vehicle agent system 10 is configured as a server network system including a plurality of vehicles 14 and an agent server 12 that serves as an example of a vehicle agent device.

In each vehicle 14, an on-board unit 16 is mounted, and communication between the agent server 12 and the on-board units 16 is performed via a communication network 18.

Figure 2:
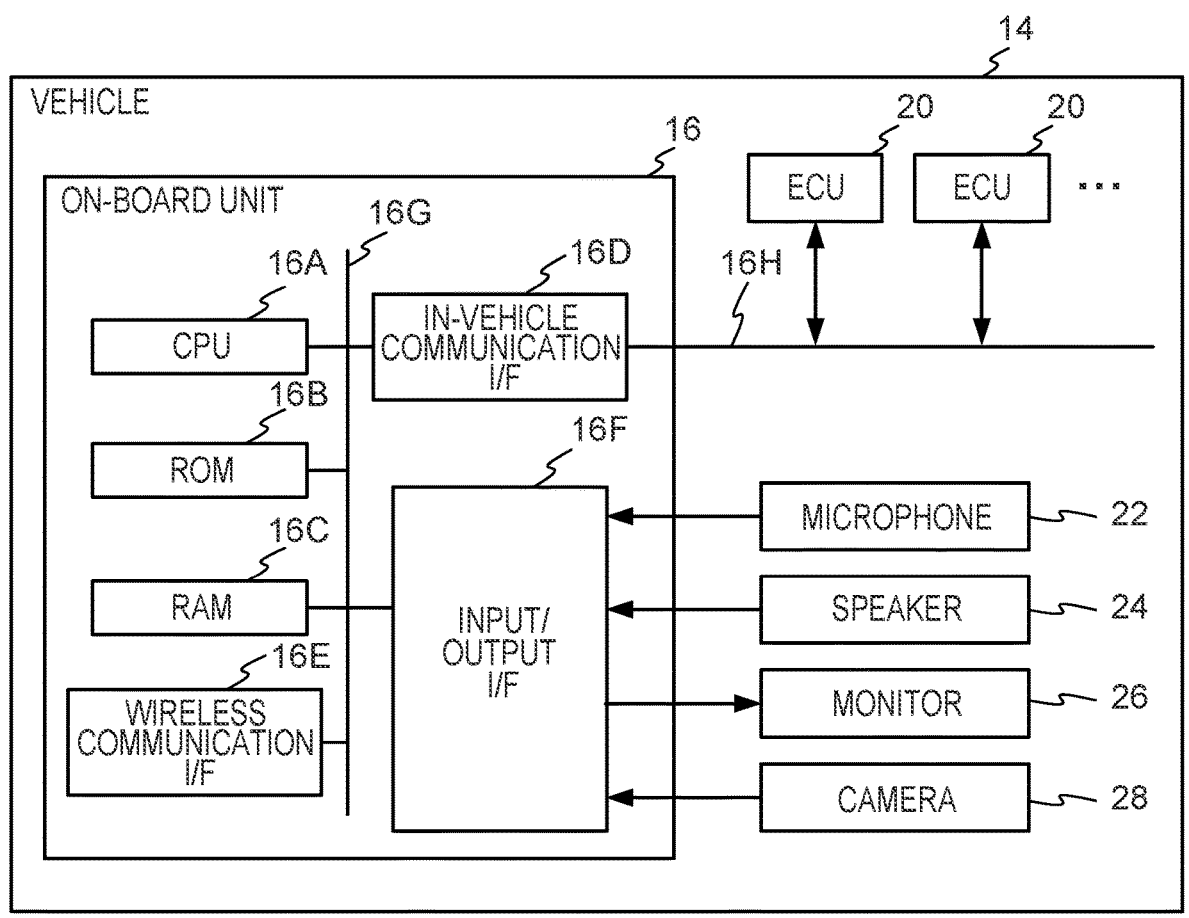
FIG. 2 is a block diagram showing an example of hardware configurations of a vehicle of the embodiment.

Next, hardware configurations of the vehicle 14 will be described. FIG. 2 is a block diagram showing an example of the hardware configurations of the vehicle 14 of the embodiment.

As shown in FIG. 2, the vehicle 14 is configured to include the on-board unit 16, a plurality of ECUs 20, a microphone 22, a speaker 24, a monitor 26, and a camera 28.

The on-board unit 16 is configured to include a central processing unit (CPU) 16A, a read-only memory (ROM) 16B, a random-access memory (RAM) 16C, an in-vehicle communication interface (I/F) 16D, a wireless communication I/F 16E, and an input/output I/F 16F. The CPU 16A, the ROM 16B, the RAM 16C, the in-vehicle communication I/F 16D, the wireless communication I/F 16E, and the input/output I/F 16F are communicably connected to each other via an internal bus 16G.

The CPU 16A is a central processing unit, executes various types of programs, and controls each part of the on-board unit 16. That is, the CPU 16A reads programs from the ROM 16B and executes the programs using the RAM 16C as a workspace.

The ROM 16B stores various types of programs and various types of data. The ROM 16B of this embodiment stores a control program for controlling the on-board unit 16.

The RAM 16C, as mentioned above, temporarily stores programs or data as a workspace when the CPU 16A executes various types of programs.

The in-vehicle communication I/F 16D is an interface for connecting to the ECUs 20. The interface uses the CAN protocol communication standard. The in-vehicle communication I/F 16D is connected to an external bus 16H. The plural ECUs 20 are provided for each function of the vehicle 14. Examples of the ECUs 20 in this embodiment include a vehicle control ECU, an engine ECU, a brake ECU, a body ECU, and a multimedia ECU.

The wireless communication I/F 16E is a wireless communication module for communicating with the agent server 12. The wireless communication module uses a communication standard such as 5G, LTE, or Wi-Fi (registered trademark), for example. The wireless communication I/F 16E is connected to the communication network 18.

The input/output I/F 16F is an interface for communicating with the microphone 22, the speaker 24, the monitor 26, and the camera 28 that are mounted in the vehicle 14.

The microphone 22 is provided in a front pillar or dashboard, for example, of the vehicle 14, and is a device that collects speech produced by the occupant.

The speaker 24 is provided in a door trim, for example, and outputs music and also speech based on information received from the agent server 12.

The monitor 26 is provided in a center console or instrument panel, for example, and is a monitor such as a liquid crystal monitor for displaying various types of information. The monitor 26 may also be provided as a touch panel including an operation unit such as an input switch.

The camera 28 is provided in the cabin, near the rear-view mirror for example, and captures an image of the occupant such as the driver. In this embodiment, the camera 28 mainly captures an image of the face of the occupant to identify the occupant.

Figure 3:
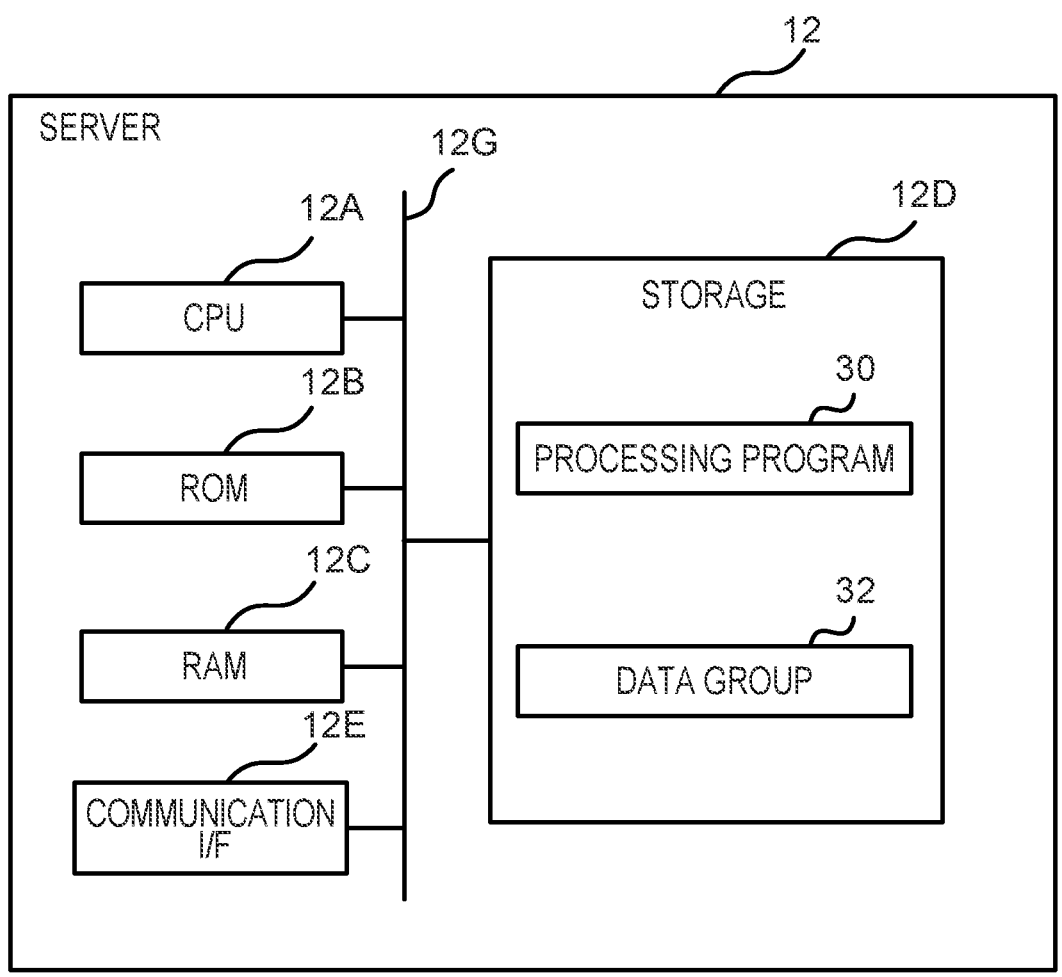
FIG. 3 is a block diagram showing hardware configurations of an agent server of the embodiment.

Next, hardware configurations of the agent server 12 will be described. FIG. 3 is a block diagram showing the hardware configurations of the agent server 12 of the embodiment.

As shown in FIG. 3, the agent server 12 is configured to include a CPU 12A, a ROM 12B, a RAM 12C, a storage 12D, and a communication I/F 12E. The CPU 12A, the ROM 12B, the RAM 12C, the storage 12D, and the communication I/F 12E are communicably connected to each other via an internal bus 12G. The functions of the CPU 12A, the ROM 12B, the RAM 12C, and the communication I/F 12E are the same as those of the CPU 16A, the ROM 16B, the RAM 16C, and the wireless communication I/F 16E of the on-board unit 16 described above.

The storage 12D is configured by a storage device such as a hard disk drive (HDD) or a solid-state drive (SSD) and stores various types of programs and various types of data.

The CPU 12A reads programs from the storage 12D and executes the programs using the RAM 12C as a workspace.

The storage 12D of this embodiment stores a processing program 30 and a data group 32. The processing program 30 is a program for realizing functions that the agent server 12 has.

Figure 4:
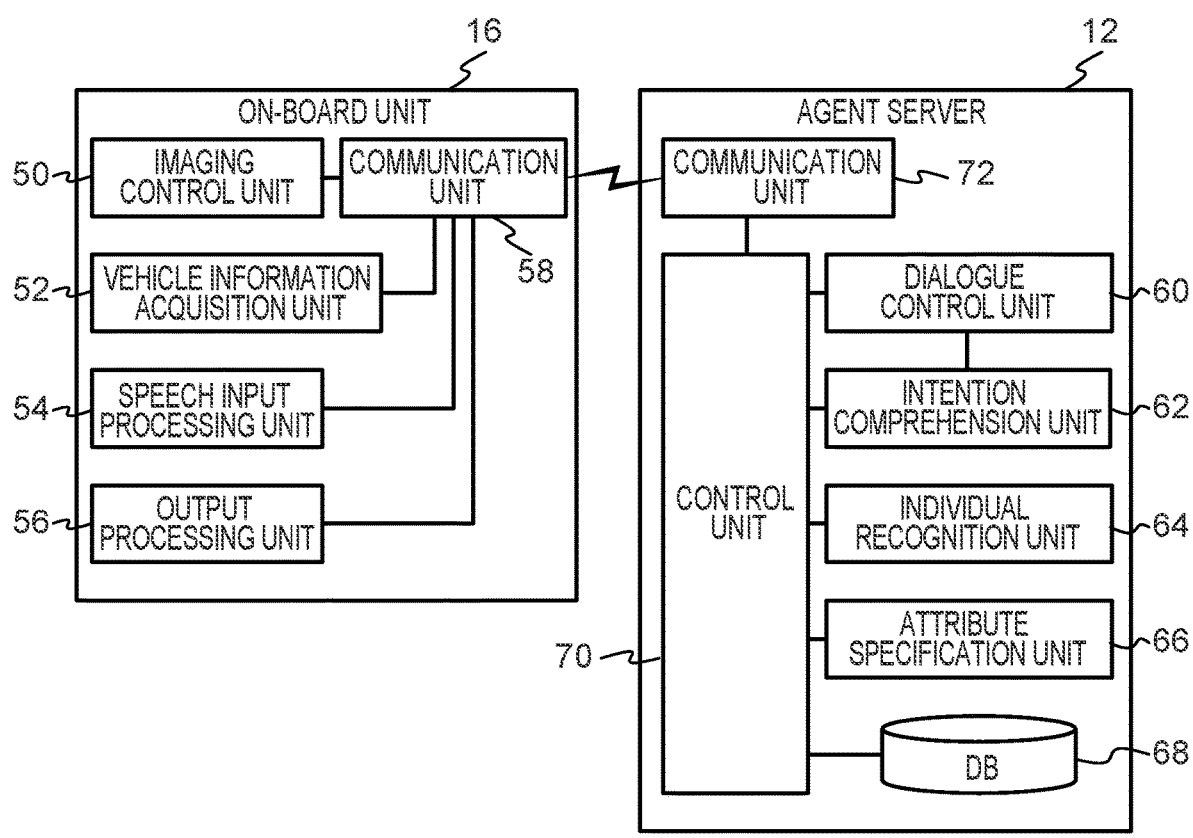
FIG. 4 is a functional block diagram showing functional configurations of an on-board unit and the agent server.

Next, functional configurations of each of the on-board unit 16 and the agent server 12 will be described. FIG. 4 is a functional block diagram showing the functional configurations of the on-board unit 16 and the agent server 12.

The on-board unit 16 has functions of an imaging control unit 50, a vehicle information acquisition unit 52, a speech input processing unit 54, an output processing unit 56, and a communication unit 58 as a result of the CPU 16A transferring to the RAM 16C and executing the programs stored in the ROM 16B.

The imaging control unit 50 controls the imaging by the camera 28 provided in the cabin to capture an image of the face, for example, of the occupant to identify the occupant and generate image information representing the captured image.

The vehicle information acquisition unit 52 acquires various types of information relating to the vehicle 14 in which the on-board unit 16 is mounted. Examples of the vehicle information that the vehicle information acquisition unit 52 acquires include information that identifies the vehicle model, information that identifies the vehicle, information relating to driving, and detection results of various types of sensors mounted in the vehicle 14. In this embodiment, the vehicle information acquisition unit 52 acquires at least information that identifies the vehicle model and information that identifies the vehicle.

The speech input processing unit 54 performs processing to collect, with the microphone 22, utterances by the occupant and generate speech information.

The output processing unit 56 performs processing to output, as speech from the speaker 24, and/or processing to display on the monitor 26, response information with respect to the utterances by the occupant received from the agent server 12 via the communication unit 58 and information received from the agent server 12.

The communication unit 58 establishes communication with, and sends information to and receives information from the agent server 12. For example, the communication unit 58 performs processing to send the image information representing the captured image captured by the camera 28, the vehicle information, and the speech information generated by the speech input processing unit 54 to the agent server 12 and receive various types of information from the agent server 12.

The agent server 12 has multiple functions as a result of the CPU 12A transferring to the RAM 12C and executing the programs stored in the ROM 12B. As the multiple functions, the agent server 12 has functions of a control unit 70, a dialogue control unit 60 serving as an example of a generation unit, an intention comprehension unit 62, an individual recognition unit 64 serving as an example of an identification unit, an attribute specification unit 66 serving as an example of a specification unit, a database (DB) 68, and a communication unit 72.

The dialogue control unit 60 converts the speech information received from the on-board unit 16 to text information and outputs the text information to the intention comprehension unit 62. Furthermore, the dialogue control unit 60 performs processing to generate response information based on intention comprehension by the intention comprehension unit 62. The dialogue control unit 60 generates the response information by, for example, extracting a corresponding response from prestored responses corresponding to intention comprehension results.

The intention comprehension unit 62, in order to comprehend the intention of an utterance by the occupant, comprehends, based on the text information to which the speech information was converted, the intention represented by the text information. For the intention comprehension, a variety of known techniques may be applied to comprehend the intention of the utterance by the occupant, so detailed description thereof is omitted here.

The individual recognition unit 64 performs a process to recognize the occupant from among users preregistered in the DB 68 based on the captured image of the occupant received from the on-board unit 16.

The attribute specification unit 66 specifies, based on information stored in the DB 68, attributes such as the driving skills, driving tendencies, and function awareness of the occupant recognized by the individual recognition unit 64 and whether or not the occupant has used the vehicle functions.

The DB 68 is a storage region provided in a region within the storage 12D, and the DB 68 stores various types of information, such as information for comprehending the intentions of text information, information for identifying individuals, information for specifying attributes, and information introducing the functions of each vehicle. The information introducing the functions of each vehicle may include at least one of information relating to the functions themselves and information relating to methods of operation for using the functions.

The control unit 70 controls the sending and receiving of information that is conducted via the communication unit 72. For example, the control unit 70 performs processing to extract from the DB 68 the information (e.g., character information, a moving image, etc.) introducing vehicle functions corresponding to the attributes of the occupant identified by the individual recognition unit 64 and specified by the attribute specification unit 66 and send to the on-board unit 16 the information relating to the vehicle in which the occupant will ride from the information it extracted, to thereby output, as introduction information, the information introducing the vehicle functions. When the control unit 70 extracts from the DB 68 the information introducing the functions corresponding to the attributes of the occupant, the control unit 70 may extract information introducing functions whose frequency of use is equal to or less than a predetermined frequency of use or functions that the occupant has not used for a period of time equal to or greater than a predetermined period of time out of the functions corresponding to the attributes. Alternatively, the control unit 70 may specify, as the attributes, a vehicle model history and extract, from the vehicle model history of the occupant, functions that the occupant has never used including past vehicles out of the functions of the vehicle in which the occupant is currently riding. Alternatively, the control unit 70 may also specify, as the attributes, a history of vehicle models in which the occupant has ridden and extract, from the vehicle model history of the occupant, functions with methods of operation that are different from past methods of operation. Furthermore, as the information introducing vehicle functions, the control unit 70 may extract information relating to the functions themselves, or may extract, as the introduction information, information relating to methods of operation for using the vehicle functions, or may extract information relating to the vehicle functions themselves and information relating to methods of operation for using the functions.

Furthermore, the control unit 70, when outputting a moving image introducing the vehicle functions, performs processing to adjust the playback time of the moving image in accordance with a predetermined condition (e.g., a condition such as related information relating to at least one of the day, the time of day, and times when the vehicle is expected to be stopped). The control unit 70 adjusts the playback time by adjusting at least one of the playback speed and the number of contents.

The communication unit 72 establishes communication with, and sends information to and receives information from, the on-board unit 16. For example, the communication unit 72 performs processing to receive from the on-board unit 16 the image information representing the captured image, the vehicle information, and the speech information and send various types of information such as device description information from the agent server 12 to the on-board unit 16.

Next, specific processes performed by each part of the vehicle agent system 10 pertaining to the embodiment configured as described above will be described.

Figure 5:
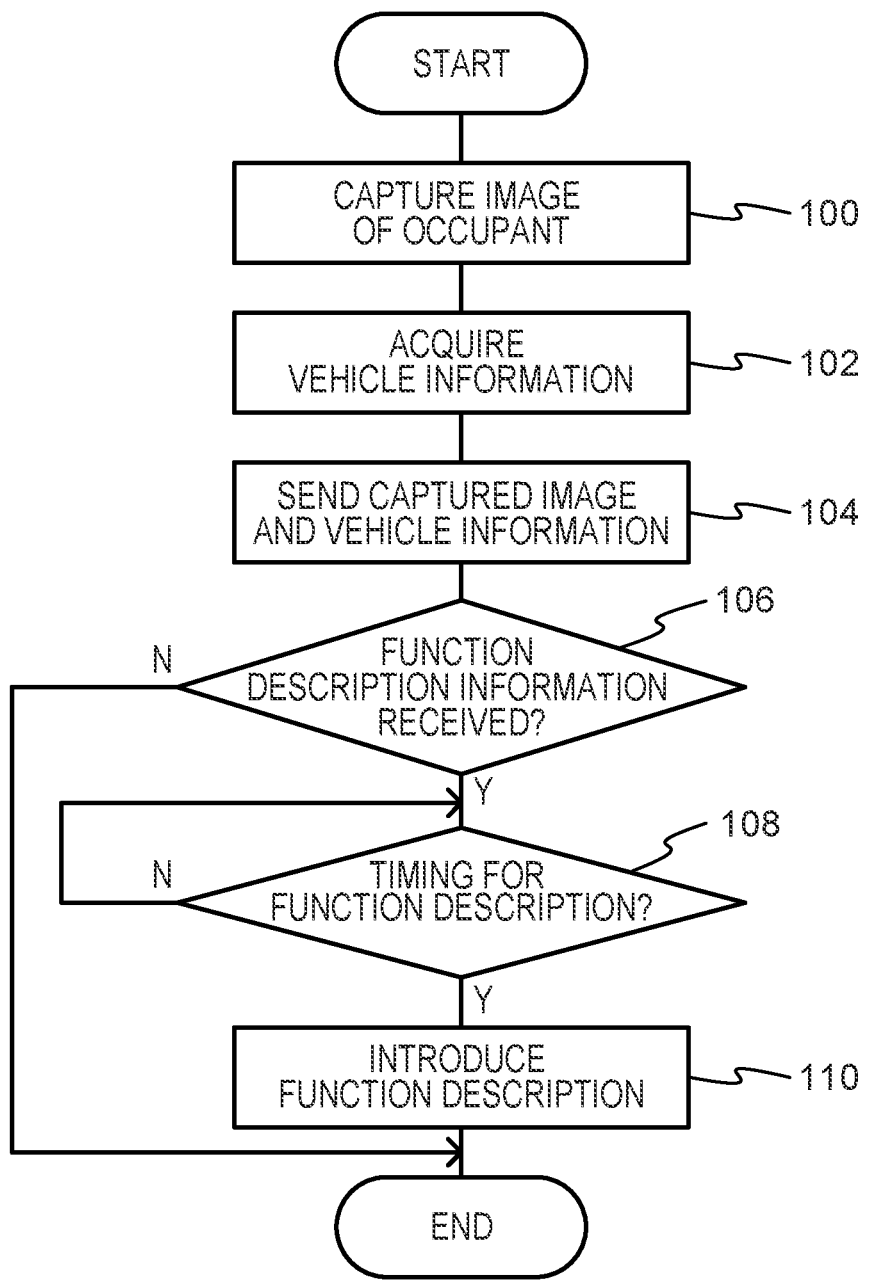
FIG. 5 is a flowchart showing an example of a flow of processes performed by the on-board unit when an occupant has gotten into the vehicle in the vehicle agent system pertaining to the embodiment.

First, an example of a flow of processes performed by the on-board unit 16 when the occupant has gotten into the vehicle 14 will be described. FIG. 5 is a flowchart showing an example of the flow of the processes performed by the on-board unit 16 when the occupant has gotten into the vehicle 14 in the vehicle agent system 10 pertaining to the embodiment. The processes in FIG. 5 start when the occupant has gotten into the vehicle 14. For example, the processes may start when the ignition switch has been switched on, or may start when a seat occupancy sensor or the like has detected that the occupant has gotten into the vehicle.

In step 100 the CPU 16A captures, with the camera 28, an image of the occupant, and then the CPU 16A moves to step 102. That is, the imaging control unit 50 controls the imaging by the camera 28 provided in the cabin to capture an image of the face, for example, of the occupant to identify the occupant.

In step 102 the CPU 16A acquires the vehicle information, and then the CPU 16A moves to step 104. That is, the vehicle information acquisition unit 52 acquires the vehicle information including at least the information that identifies the vehicle model of the vehicle in which the on-board unit 16 is mounted and the information that identifies the vehicle.

In step 104 the CPU 16A sends the captured image and the vehicle information to the agent server 12, and then the CPU 16A moves to step 106. That is, that communication unit 58 establishes communication with the agent server 12 and sends the captured image and the vehicle information to the agent server 12.

In step 106 the CPU 16A determines whether or not it has received the function description information from the agent server 12. The CPU 16A performs this determination based on whether or not it has received the function description information that the agent server 12 sends by means of processing by the agent server 12 described later. In a case where the determination is YES, the CPU 16A moves to step 108, and in a case where the determination is NO, the CPU 16A ends the series of processes.

In step 108 the CPU 16A determines whether or not the timing is a timing for function description. The CPU 16A performs this determination based on, for example, whether or not the vehicle is in a predetermined situation that will not affect driving, such as stopped. The CPU 16A stands by until the determination becomes YES, and then moves to step 110.

In step 110 the CPU 16A introduces the function description, and then the CPU 16A ends the series of processes. For example, the output processing unit 56 performs processing to output as a voice from the speaker 24, and/or processing to display on the monitor 26, the device description information received via the communication unit 58 from the agent server 12. In this embodiment, the function description is introduced based on the information introducing the vehicle functions corresponding to the attributes of the occupant. For example, a vehicle function description according to the attributes of the occupant—such as the driving skills, driving tendencies, and function awareness of the driver, whether or not the driver has used the vehicle functions, and the vehicle history of the driver—is proposed. Because of this, when introducing vehicle functions to occupants, introductions appropriate to each occupant can be provided. Furthermore, the function description is performed at a timing for function description, such as a situation that poses no obstruction to driving, so it becomes possible to ensure safety when the occupant views, by means of the moving image, the function introduction.

Figure 6:
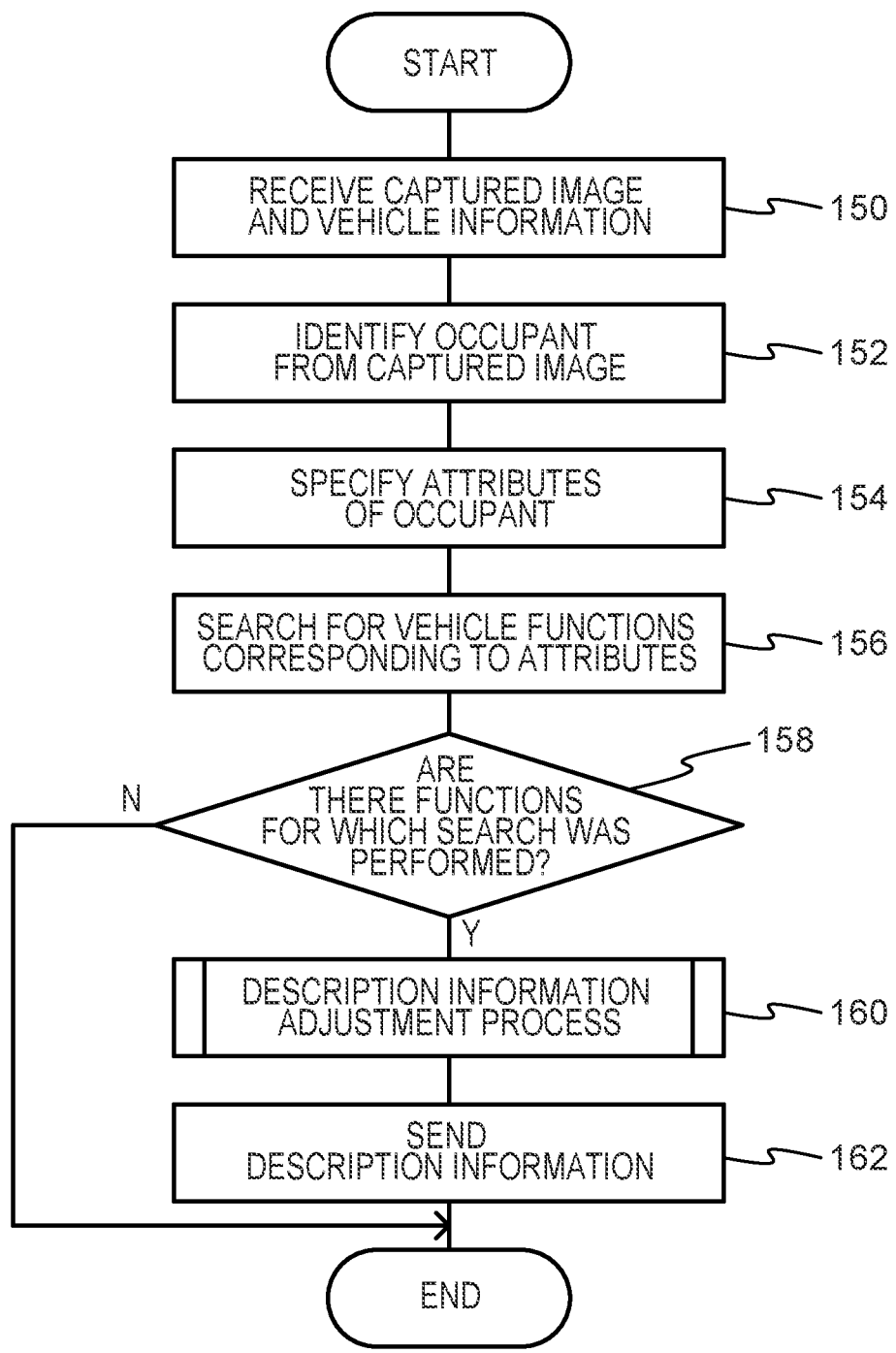
FIG. 6 is a flowchart showing an example of a flow of processes performed by the agent server when a captured image and vehicle information have been sent from the on-board unit in the vehicle agent system pertaining to the embodiment.

Next, an example of a flow of processes performed by the agent server 12 when the captured image and the vehicle information have been sent from the on-board unit 16 will be described. FIG. 6 is a flowchart showing an example of the flow of the processes performed by the agent server 12 when the captured image and the vehicle information have been sent from the on-board unit 16 in the vehicle agent system 10 pertaining to the embodiment. The processes in FIG. 6 start when the captured image and the vehicle information have been sent from the on-board unit 16 to the agent server 12 by step 104 described above.

In step 150 the CPU 12A receives the captured image and the vehicle information from the on-board unit 16, and then the CPU 12A moves to step 152. That is, the CPU 12A receives the captured image and the vehicle information sent from the on-board unit 16 in step 104 described above.

In step 152 the CPU 12A identifies the occupant from the captured image it received, and then the CPU 12A moves to step 154. That is, the individual recognition unit 64 performs processing to recognize the occupant from among preregistered users based on the captured image of the occupant received from the on-board unit 16. For example, an image in which the face of the occupant is captured and information about the occupant (e.g., personal information such as name, address, and age) are preregistered in the agent server 12. The CPU 12A identifies the corresponding occupant by using the captured image it received to search for the registration information and specify the corresponding occupant.

In step 154 the CPU 12A specifies the attributes of the occupant it identified, and then the CPU 12A moves to step 156. That is, the attribute specification unit 66 specifies the attributes of the occupant recognized by the individual recognition unit 44, such as the driving skills, driving tendencies, and function awareness of the occupant and whether or not the occupant has used the vehicle functions. For example, attribute information relating to the occupant is stored beforehand in correlation with information about the occupant in the DB 68, and the attribute specification unit 66 specifies the corresponding attribute information.

In step 156 the CPU 12A searches for vehicle functions corresponding to the attributes it identified, and then the CPU 12A moves to step 158. That is, the control unit 70 extracts rom the DB 68 the information (e.g., character information, a moving image, etc.) introducing vehicle functions corresponding to the attributes of the occupant identified by the individual recognition unit 64 and specified by the attribute specification unit 66 and extracts information corresponding to the vehicle in which the occupant will ride from the information it extracted based on the vehicle information. When the control unit 70 extracts from the DB 68 the information introducing the functions corresponding to the attributes of the occupant, the control unit 70 may extract information introducing functions whose frequency of use is equal to or less than a predetermined frequency of use or functions that the occupant has not used for a period of time equal to or greater than a predetermined period of time out of the functions corresponding to the attributes. Alternatively, the control unit 70 may specify, as the attributes, a vehicle model history and extract, from the vehicle model history of the occupant, functions that the occupant has never used including past vehicles out of the functions of the vehicle in which the occupant is currently riding. Alternatively, the control unit 70 may also specify, as the attributes, a history of vehicle models in which the occupant has ridden and extract, from the vehicle model history of the occupant, functions with methods of operation that are different from past methods of operation. Furthermore, as the information introducing vehicle functions, the control unit 70 may extract information relating to the functions themselves, or may extract, as the introduction information, information relating to methods of operation for using the vehicle functions, or may extract information relating to the vehicle functions themselves and information relating to methods of operation for using the functions.

In step 158 the CPU 12A determines whether or not there are functions for which it searched. The CPU 12A performs this determination based on whether or not the control unit 70 was able to extract information introducing vehicle functions corresponding to the attributes of the occupant. In a case where the determination is YES, the CPU 12A moves to step 160, and in a case where the determination is NO, the CPU 12A ends the series of processes.

In step 160 the CPU 12A performs a description information adjustment process, and then the CPU 12A moves to step 162. In the description information adjustment process, the CPU 12A performs a process to adjust the playback time of the moving image introducing the vehicle functions in accordance with a predetermined condition (e.g., a condition such as related information relating to at least one of the day, the time of day, and times when the vehicle is expected to be stopped). For example, the CPU 12A may adjust the playback time to be shorter on weekdays from Monday to Friday and set the playback time to a default playback time on holidays such as Saturday and Sunday. Alternatively, because the occupant is likely to be busy during the day, the CPU 12A may also adjust the playback time to be shorter during the day and set the playback time to a predetermined default playback time at times other than during the day. Furthermore, if the CPU 12A knows, from the vehicle information it has acquired for example, times when the vehicle stops (e.g., times when the vehicle stops at a red light, etc.), the CPU 12A may adjust the playback time to a playback time conforming to a time when the vehicle is stopped. Because of this, it becomes possible for the occupant to view the function description at a playback time suited to the situation of the occupant. The CPU 12A may adjust the playback time by adjusting the playback speed, or by adjusting the number of contents to be played back, or by adjusting both the playback speed and the number of contents.

In step 162 the CPU 12A sends, as description information to the on-board unit 16 from which the captured image and the vehicle information were sent, the moving image introducing the vehicle functions whose playback time was adjusted by the description information adjustment process, and then the CPU 12A ends the series of processes. Because of this, in the on-board unit 16, the determination in step 106 described above becomes YES, and descriptions of functions corresponding to the attributes of the occupant are introduced to the occupant. Because descriptions of functions corresponding to the attributes of the occupant are introduced to the occupant, when introducing vehicle functions to occupants, introductions appropriate to each occupant can be provided.

Because the on-board unit 16 and the agent server 12 perform the processes in this way, descriptions of vehicle functions matching the attributes of the occupant can be introduced. Consequently, when introducing vehicle functions to occupants, introductions appropriate to each occupant can be provided.

Specifically, descriptions of functions, such as how to use functions that have been forgotten and are not being used (e.g., driving assist functions such as auto cruise control and lane keeping assist), can be introduced to an occupant whose attributes include low function awareness where the occupant does not much use the functions installed in the vehicle. Furthermore, if the vehicle history is known as an attribute of the occupant, then when the occupant changes cars and a method of operation in the vehicle model to which the occupant has changed is different from the one in the vehicle model from which the occupant has changed, the method of operation in the vehicle model to which the occupant has changed can be introduced as a function description. Furthermore, description of a function to prevent pedal misapplication can be introduced as a function description to an occupant whose attributes include a tendency to have low driving skills, such as an elderly person.

Figure 7:
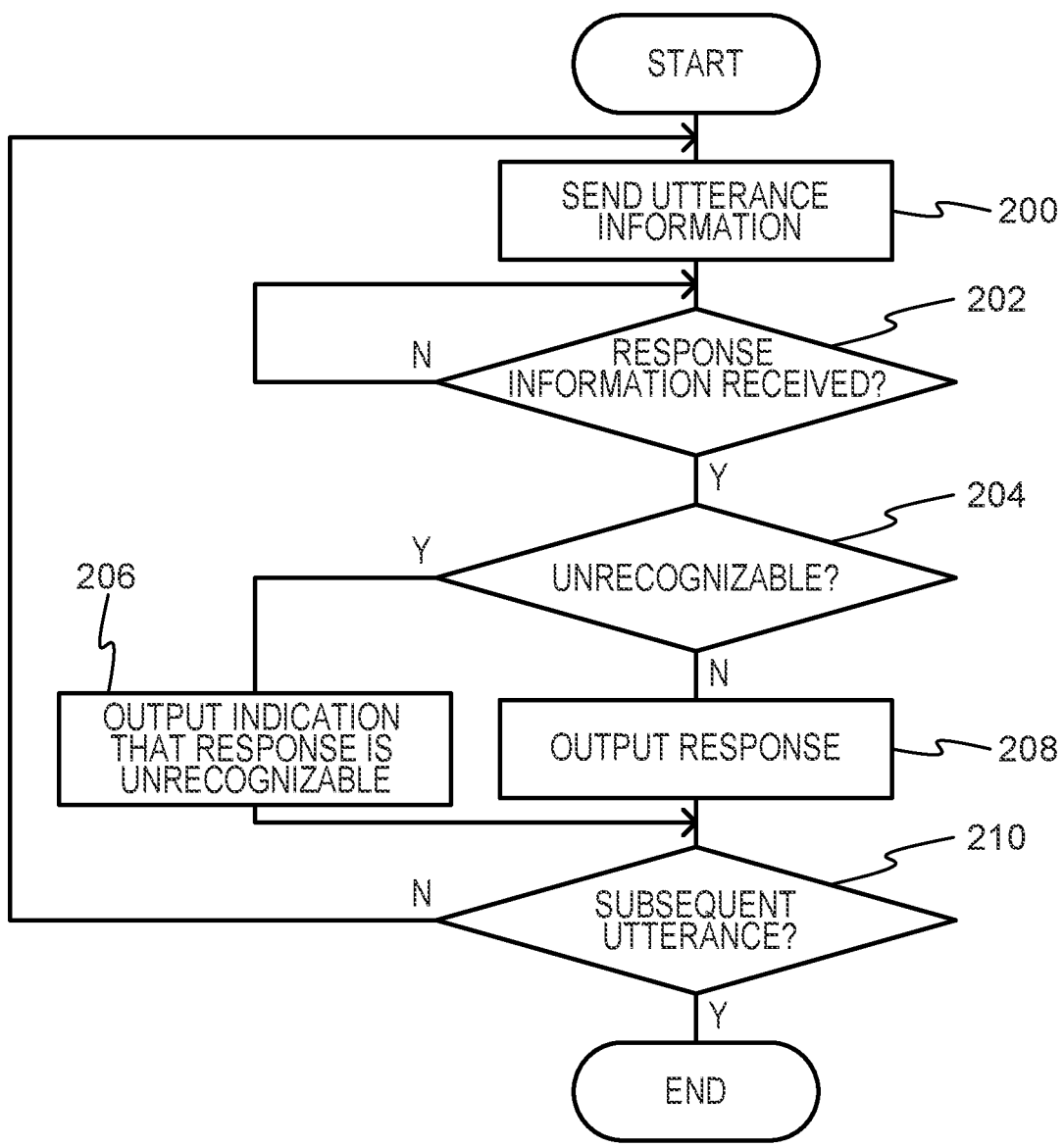
FIG. 7 is a flowchart showing an example of a flow of processes performed by the on-board unit when the occupant converses with the agent server via the on-board unit in the vehicle agent system pertaining to the embodiment.

Next, processes performed by the on-board unit 16 when the occupant converses with the agent server 12 via the on-board unit 16 in the vehicle agent system 10 pertaining to the embodiment will be described. FIG. 7 is a flowchart showing an example of a flow of the processes performed by the on-board unit 16 when the occupant converses with the agent server 12 via the on-board unit 16 in the vehicle agent system 10 pertaining to the embodiment. The processes in FIG. 7 start when, for example, the on-board unit 16 has detected a predetermined utterance by the occupant.

In step 200 the CPU 16A sends utterance information to the agent server 12, and then the CPU 16A moves to step 202. That is, the speech input processing unit 54 collects, with the microphone 22, the utterance by the occupant, generates speech information, and sends the speech information as the utterance information to the agent server 12.

In step 202 the CPU 16A determines whether or not it has received response information from the agent server 12. The CPU 16A stands by until the determination becomes YES, and then moves to step 204.

In step 204 the CPU 16A determines whether or not the response it received is a response indicating that the content of the utterance is unrecognizable. In a case where the determination is YES, the CPU 16A moves to step 206, and in a case where the determination is NO, the CPU 16A moves to step 208.

In step 206 the CPU 16A outputs an indication that the content of the utterance is unrecognizable, and then the CPU 16A moves to step 210. That is, the output processing unit 56 outputs, as speech from the speaker 24, an indication that the content of the utterance is unrecognizable as the response information with respect to the utterance by the occupant received via the communication unit 58 from the agent server 12. Furthermore, the CPU 16A may also display on the monitor 26 an indication that the content of the utterance is unrecognizable.

In step 208 the CPU 16A outputs the response, and then the CPU 16A moves to step 210. That is, the output processing unit 56 outputs, as speech from the speaker 24, the response information with respect to the utterance by the occupant received via the communication unit 58 from the agent server 12. Furthermore, the CPU 16A may also display the response information on the monitor 26.

In step 210 the CPU 16A determines whether or not there is a subsequent utterance. The CPU 16A performs this determination based on whether or not the speech input processing unit 54 has detected, by collecting with the microphone 22, a subsequent utterance by the occupant. In a case where the determination is NO, the CPU 16A returns to step 200 and repeats the processes described above, and when the determination becomes YES, the CPU 16A ends the series of processes.

Figure 8:
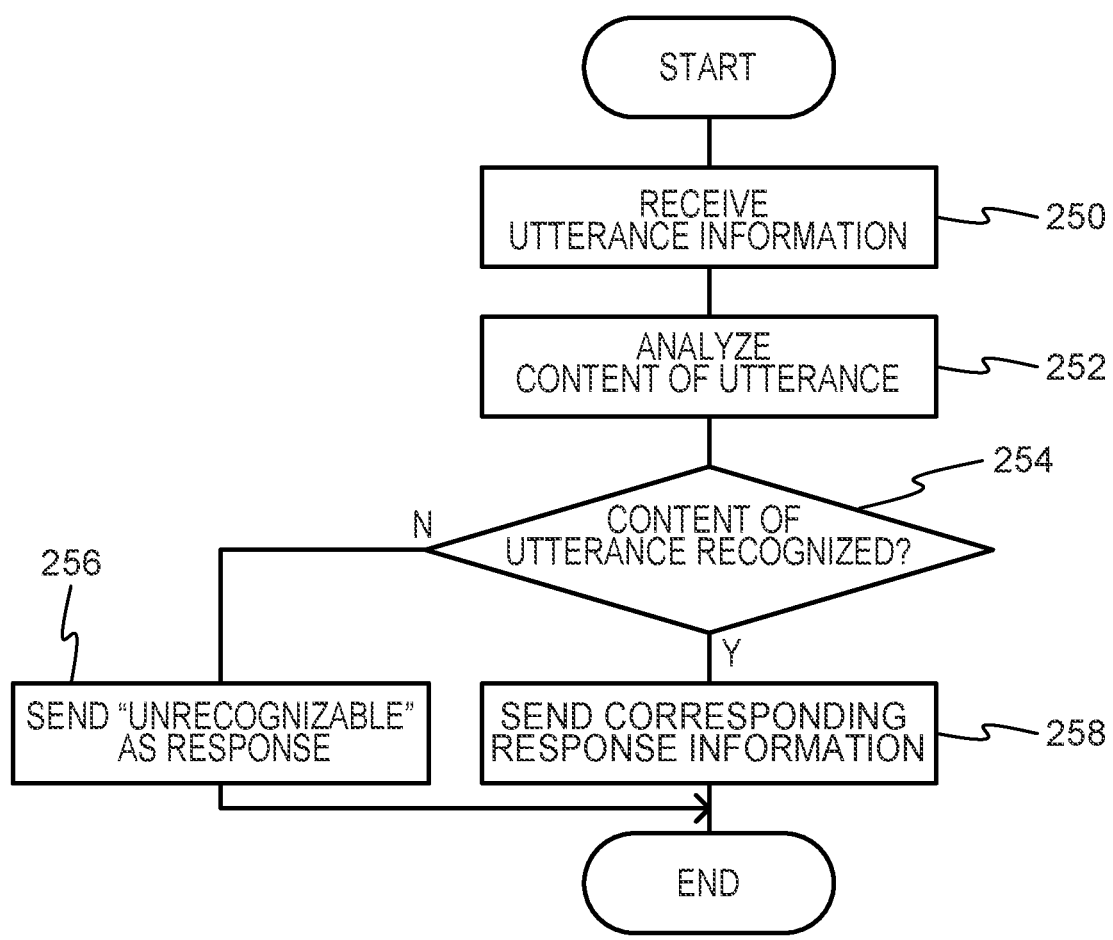
FIG. 8 is a flowchart showing an example of a flow of processes performed by the agent server when the occupant converses with the agent server via the on-board unit in the vehicle agent system pertaining to the embodiment.

Next, processes performed by the agent server 12 when the occupant converses with the agent server 12 via the on-board unit 16 in the vehicle agent system 10 pertaining to the embodiment will be described. FIG. 8 is a flowchart showing an example of a flow of the processes performed by the agent server 12 when the occupant converses with the agent server 12 via the on-board unit 16 in the vehicle agent system 10 pertaining to the embodiment. The processes in FIG. 8 start when the utterance information has been sent from the on-board unit 16 to the agent server 12 by step 200 described above.

In step 250 the CPU 12A receives the utterance information from the on-board unit 16, and then the CPU 12A moves to step 252. That is, the control unit 70 receives the utterance information via the communication unit 72 from the on-board unit 16.

In step 252 the CPU 12A analyzes the content of the utterance, and then the CPU 12A moves to step 254. That is, the dialogue control unit 60 converts the speech information received from the on-board unit 16 to text information, and the intention comprehension unit 62 comprehends, based on the text information to which the speech information was converted, the intention represented by the text information. Various types of known technologies can be used to comprehend the intention of the text information.

In step 254 the CPU 12A determines whether or not it has recognized the content of the utterance. The CPU 12A performs this determination based on whether or not the dialogue control unit 60 was able to recognize the content of the utterance as a result of the intention comprehension having been performed. In a case where the determination is NO, the CPU 12A moves to step 256, and in a case where the determination is YES, the CPU 12A moves to step 258.

In step 256 the CPU 12A sends "unrecognizable" as a response to the on-board unit 16, and then the CPU 12A ends the series of processes. That is, the control unit 70 sends response information via the communication unit 72 to the on-board unit 16 that sent the utterance information. Because of this, the determinations in step 202 and step 204 described above become YES.

In step 258 the CPU 12A sends the corresponding response, and then the CPU 12A ends the series of processes. That is, the dialogue control unit 60 generates response information based on the intention comprehension by the intention comprehension unit 62. Then, the control unit 70 sends the response information via the communication unit 72 to the on-board unit 16 that sent the utterance information. Because of this, the determination in step 202 described above becomes YES, the determination in step 204 becomes NO, and the occupant is notified of the response information.

Because the on-board unit 16 and the agent server 12 perform the processes in this way, the occupant and the agent server 12 can converse with each other. Furthermore, in a case where a vehicle function description has been introduced from the agent server 12, it becomes possible for the occupant, by means of a dialogue, to instruct whether or not to use the introduced function and/or to instruct additional description by dialogue.

Although in the above embodiment an example was described where dialogue with the agent server 12 is possible, the vehicle agent system 10 is not limited to this and may also have a configuration where the dialogue function is omitted. In this case, for example, the vehicle agent system 10 may have a configuration where the functions of the dialogue control unit 60 and the intention comprehension unit 62 are omitted, the processes in FIG. 7 and FIG. 8 are omitted, and only the processes of FIG. 5 and FIG. 6 are performed.

Furthermore, the processes performed by each part of the vehicle agent system 10 in the above embodiment were described as software processes performed by executing programs, but the processes are not limited to this. For example, the processes may also be performed by hardware such as a graphics processing unit (GPU), an application-specific integrated circuit (ASIC), and a field-programmable gate array (FPGA). Alternatively, the processes may also be performed by a combination of both software and hardware. Furthermore, in a case where the processes are performed by software, the programs may be stored in various types of storage media and circulated.

Moreover, it goes without saying that the disclosure is not limited to what is described above and can, in addition to what is described above, be modified in a variety of ways and implemented in a range that does not depart from the spirit of the disclosure.

What is claimed is:

1. A vehicle agent device comprising:
   a processor; and
   memory storing instructions that, when executed by the processor, cause the vehicle agent device to:
   identify an occupant who has gotten into a vehicle based on obtaining image information of the occupant from a camera, transmitting the image information to a server, and receiving a response from the server with information corresponding to the occupant;

specify one or more first attributes of the occupant identified based on the information corresponding to the occupant;

obtain, from the server, introduction information comprising a moving image that introduces, out of functions that the vehicle has, one or more first functions corresponding to the one or more first attributes, wherein the introduction information includes methods of operation for using the one or more first functions; and convert the introduction information into adjusted introduction information having a playback time according to predetermined condition, by adjusting at least one of: (i) a playback speed of the introduction information or (ii) an amount of content of the introduction information to be played back, wherein the predetermined condition is a temporal condition including at least one of a day of week or a time of day; and output the adjusted introduction information to an on-board unit mounted in the vehicle.

2. The vehicle agent device of claim 1, wherein the on-board unit introduces the one or more first functions with the moving image based on the vehicle being in one or more situations predetermined to not affect driving, and wherein the one or more situations comprise the vehicle being stopped.

3. The vehicle agent device of claim 1, wherein the processor is configured to execute the instructions to cause the vehicle agent device to output the introduction information relating to:

a third function of the one or more first functions whose frequency of use is equal to or less than a predetermined frequency of use, or a fourth function of the one or more first functions that has not been used for a period of time equal to or greater than a predetermined period of time.

4. The vehicle agent device of claim 2, wherein the processor is configured to execute the instructions to cause the vehicle agent device to output the introduction information relating to:

a third function of the one or more first functions whose frequency of use is equal to or less than a predetermined frequency of use, or a fourth function of the one or more first functions that has not been used for a period of time equal to or greater than a predetermined period of time.

5. The vehicle agent device of claim 1, wherein the processor specifies, as an attribute of the one or more first attributes, a history of vehicle models in which the occupant identified has ridden and, from the history, identifies historically unused functions out of the one or more first functions based on one or more second functions the occupant has never used including past vehicles, and outputs the introduction information relating to the historically unused functions.

6. The vehicle agent device of claim 2, wherein the processor is configured to execute the instructions to cause the vehicle agent device to specify, as an attribute of the one or more first attributes, a history of vehicle models in which the occupant identified has ridden and, from the history, output the introduction information relating to one or more second functions that the occupant has never used, including in past vehicles, out of the one or more first functions.

7. The vehicle agent device of claim 1, wherein the processor is configured to execute the instructions to cause the vehicle agent device to specify, as an attribute of the one or more first attributes, a history of vehicle models in which the occupant identified has ridden and, from the history, identify one or more updated functions out of the one or more first functions with first methods of operation that are different from second methods of operation of one or more second functions in the history, and output the introduction information relating to the one or more updated functions.

8. The vehicle agent device of claim 2, wherein the processor is configured to execute the instructions to cause the vehicle agent device to specify, as an attribute of the one or more first attributes, a history of vehicle models in which the occupant identified has ridden and, from the history, output the introduction information relating to one or more second functions of the one or more first functions with first methods of operation that are different from second methods of operation of one or more third functions in the history.

9. The vehicle agent device of claim 1, wherein the processor is further configured to execute the instructions to cause the vehicle agent device to:

determine an intention of first content of an utterance of the occupant based on converting the utterance to text and processing the text; and generate response information with respect to the first content based on the text.

10. The vehicle agent device of claim 2, wherein the processor is further configured to execute the instructions to cause the vehicle agent device to:

determine an intention of first content of an utterance of the occupant based on converting the utterance to text and processing the text; and generate response information with respect to the first content based on the text.

11. A vehicle agent system comprising:
the vehicle agent device of claim 1; and
the on-board unit,
wherein the on-board unit acquires information for the processor to identify the occupant, and receives and plays back the introduction information.

12. A vehicle agent system comprising:
the vehicle agent device of claim 2; and
the on-board unit,
wherein the on-board unit acquires information for the processor to identify the occupant, and receives and plays back the introduction information.

13. A non-transitory computer-readable storage medium that stores a vehicle agent program for causing a computer to function as the vehicle agent device of claim 1.

14. A non-transitory computer-readable storage medium that stores a vehicle agent program for causing a computer to function as the vehicle agent device of claim 2.

15. The vehicle agent device of claim 1, wherein the processor is configured to execute the instructions to cause the vehicle agent device to:

based on identifying a low degree of awareness of one or more second functions of the vehicle as one or more second attributes of the one or more first attributes, obtain first introduction information that introduces the one or more second functions, and wherein the degree of awareness is determined based on past usage of the one or more second functions by the occupant.

16. The vehicle agent device of claim 1, wherein the one or more first attributes comprise
an age of the occupant.

17. The vehicle agent device of claim 1, wherein the processor is configured to execute the instructions to cause the vehicle agent device to convert the introduction information into the adjusted introduction information based by adjusting the playback speed of the introduction information without adjusting the amount of content of the introduction information.

18. The vehicle agent device of claim 1, wherein the introduction information comprises a first plurality of moving images, the first plurality of moving images comprising a second plurality of moving images,
   wherein the second plurality of moving images comprises fewer than all moving images of the first plurality of images, and
   wherein the processor is configured to execute the instructions to cause the vehicle agent device to adjust the amount of content of the introduction information to be played back by playing back the second plurality of moving images.

19. The vehicle agent device of claim 1, wherein the introduction information further includes information introducing the one or more first functions themselves, in addition to the methods of operation.

20. The vehicle agent device of claim 16, wherein the introduction information further includes information relating to pedal application.

* * * * *